US011238419B2

(12) United States Patent
Owens et al.

(10) Patent No.: US 11,238,419 B2
(45) Date of Patent: Feb. 1, 2022

(54) BLOCKCHAIN SYSTEM AND METHOD WITH SECURE CRYPTOASSETS

(71) Applicant: Change Healthcare Holdings, LLC, Nashville, TN (US)

(72) Inventors: Luke Owens, San Mateo, CA (US); Theodore C. Tanner, San Mateo, CA (US); Bryan Smith, San Mateo, CA (US); Benoit Razet, San Mateo, CA (US)

(73) Assignee: Change Healthcare Holdings, LLC, Nashville, TN (US)

(*) Notice: Subject to any disclaimer, the term of this patent is extended or adjusted under 35 U.S.C. 154(b) by 314 days.

(21) Appl. No.: 16/146,775

(22) Filed: Sep. 28, 2018

(65) Prior Publication Data

US 2019/0102755 A1    Apr. 4, 2019

Related U.S. Application Data

(60) Provisional application No. 62/565,717, filed on Sep. 29, 2017.

(51) Int. Cl.
*G06Q 20/40* (2012.01)
*G06Q 30/02* (2012.01)
*G06Q 20/32* (2012.01)
*G06Q 20/34* (2012.01)
*G06Q 20/38* (2012.01)
*G06Q 20/06* (2012.01)
*G06Q 20/02* (2012.01)

(52) U.S. Cl.
CPC .......... *G06Q 20/065* (2013.01); *G06Q 20/02* (2013.01); *G06Q 2220/00* (2013.01)

(58) Field of Classification Search
CPC ............. G06Q 20/00–425; G06Q 2220/00–18
See application file for complete search history.

(56) References Cited

U.S. PATENT DOCUMENTS

| | | | |
|---|---|---|---|
| 6,446,253 B1* | 9/2002 | Mellmer | G06F 16/10 717/100 |
| 8,086,508 B2* | 12/2011 | Dheer | G06Q 40/02 705/35 |
| 2014/0173695 A1* | 6/2014 | Valdivia | G06F 21/33 726/4 |
| 2017/0109735 A1* | 4/2017 | Sheng | H04L 9/3297 |
| 2018/0091316 A1* | 3/2018 | Stradling | H04L 9/3236 |
| 2020/0226285 A1* | 7/2020 | Bulleit | G06F 21/33 |

OTHER PUBLICATIONS

Antonopoulos, A., Mastering Bitcoin, O'Reilly Media, Inc., Dec. 2014 (Year: 2014).*
Hoops, An Introduction to Public and Private Distributed Ledgers, Seminars FI/IITM SS17, Sep. 2017 (Year: 2017).*
Hoops, An Introduction to Public and Private Distributed Ledgers, Seminars FI/IITM SS17, Sep. 2017, pertinent pp. 45-47 (Year: 2017).*

* cited by examiner

*Primary Examiner* — John W Hayes
*Assistant Examiner* — Chenyuh Kuo
(74) *Attorney, Agent, or Firm* — Meunier Carlin & Curfman LLC

(57) ABSTRACT

A system and method for providing secure cryptoassets in a blockchain platform.

8 Claims, 12 Drawing Sheets

BLOCKCHAIN SYSTEM AND METHOD WITH SECURE CRYPTOASSETS

PRIORITY CLAIMS/RELATED APPLICATIONS

This application claims the benefit under 35 USC 119(e) to U.S. Provisional Patent Application Ser. No. 62/565,717, filed Sep. 29, 2017 and entitled "Blockchain System And Method With Secure Cryptoassets", the entirety of which is incorporated herein by reference.

FIELD

The disclosure relates generally to a blockchain system and method with secure cryptoassets.

BACKGROUND

Today, blockchain platforms and system are known and are being used for a number of different purposes. For example, the Intel® Hyperledger Sawtooth blockchain platform is one example of these known blockchain platforms. Further details of the Intel® Hyperledger Sawtooth blockchain platform may be found at https://www.hyperledger.org/projects/sawtooth and https://intelledger.github.io/introduction.html, both of which are incorporated herein by reference.

Some of the blockchain platforms, like BitCoin or Ethereum, have their own cryptocurrency that is used with the platform. Other blockchain platforms, such as the Intel® Hyperledger Sawtooth blockchain platform, do not have a cryptocurrency. However, it is often desirable for a network of an entity to use the blockchain platform for various transactions across industries and monetary transfer will play an essential role in the network's operations. Thus, even for a blockchain platform that does not have a cryptocurrency, it is desirable to be able to provide a secure cryptoasset component (to provide security for any cryptocurrency) on top of any blockchain platform, including platforms that do not have a cryptocurrency. Thus, a technical problem with current blockchain platforms is that the cryptoassets are not secure enough and thus it is desirable to be able to provide a secure cryptoasset component and it is to this end that the disclosure is directed.

DETAILED DESCRIPTION OF ONE OR MORE EMBODIMENTS

The disclosure is particularly applicable to secure cryptoassets on the Hyperledger Sawtooth blockchain platform for use in a healthcare transaction and it is in this context that the disclosure will be described. It will be appreciated, however, that the system and method has greater utility since it may be used to provide secure cryptoassets for other blockchain platforms, may be used for an unlimited number of different types of transactions and may be used in an unlimited number of different industries.

The most immediate and obvious concern for any currency, including a cryptocurrency, is security. For example, in the healthcare industry in which sensitive private health information (PHI) is being handled, security is imperative for all components of the network. However, currency on a blockchain network is an obvious target for a malicious actor and the secure cryptoasset component implements additional safeguards with respect to any cryptocurrency. Before describing the secure cryptoasset component in detail, an overview of blockchain systems, the distributed ledger in blockchain and an exemplary healthcare industry network implemented using blockchain that benefits from the technical solution of the secure cryptoassets are described.

Figure 1:
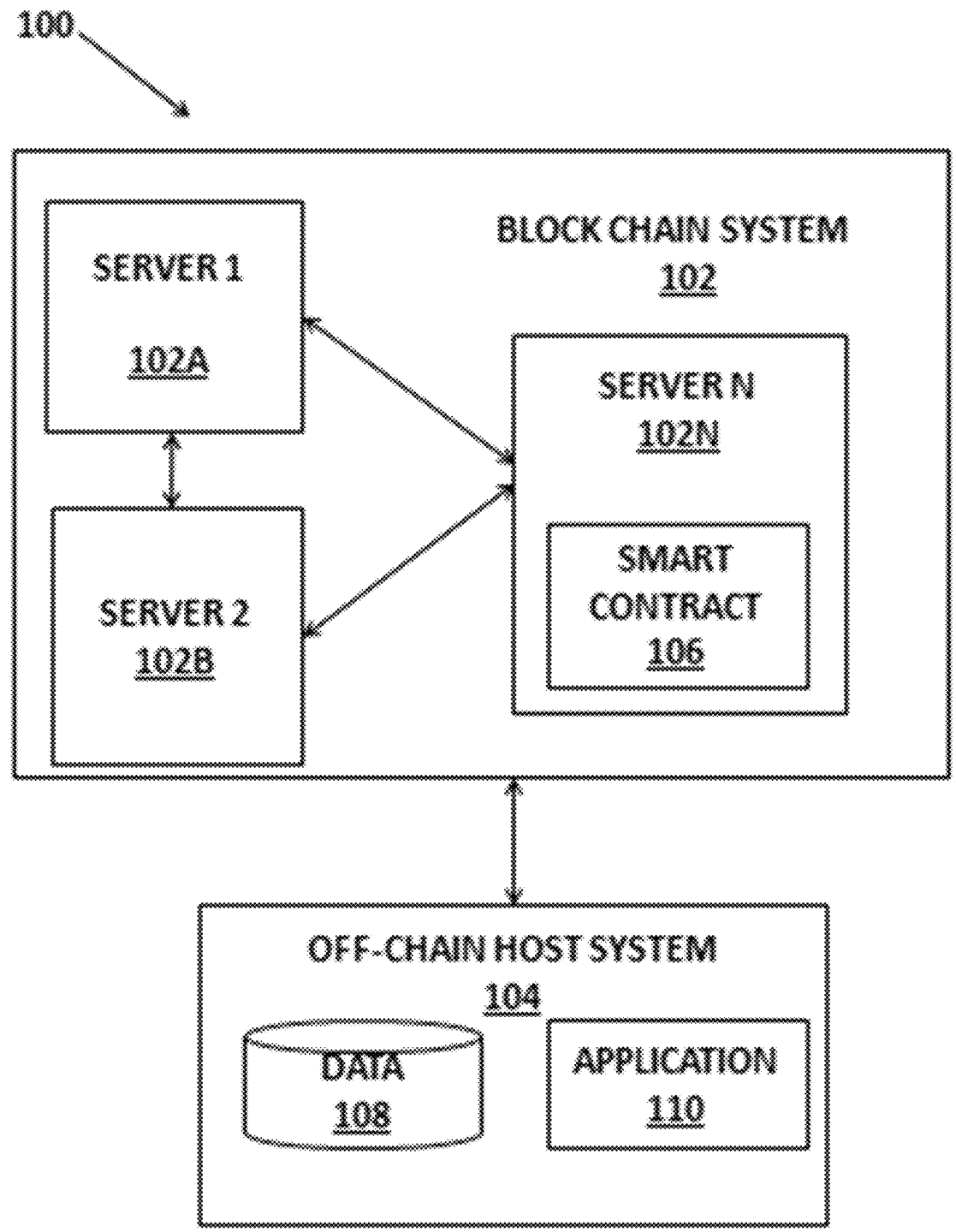
FIG. 1 illustrates an example of a system that includes a block chain system and an off-chain host system.
Figure 2:
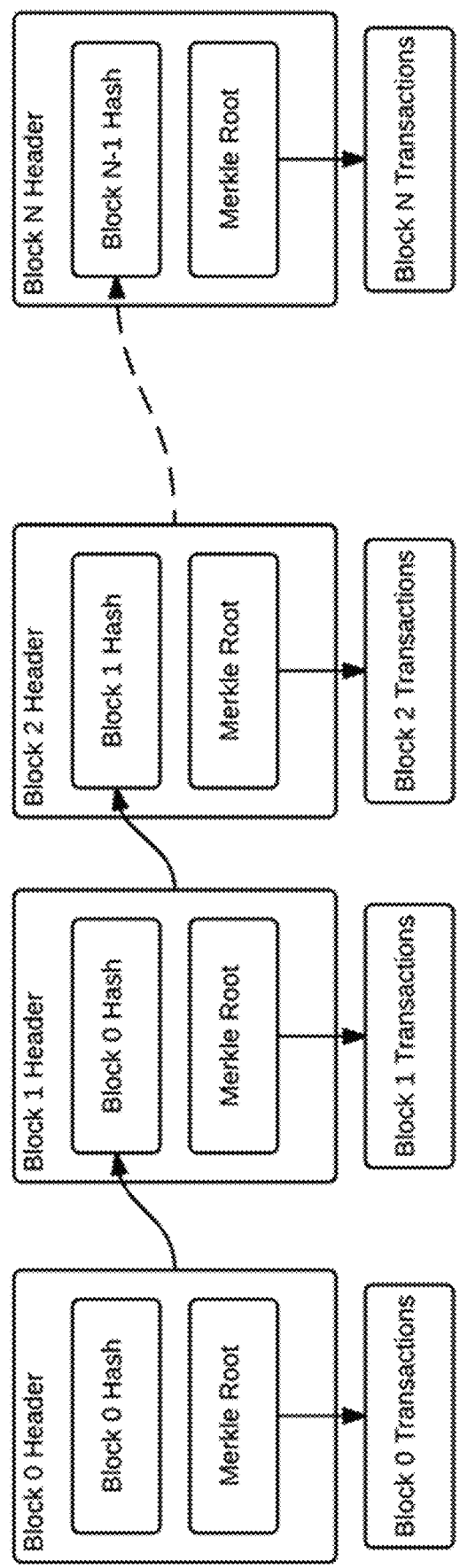
FIG. 2 illustrates an example of the blockchain ledger that is part of the block chain system.

FIG. 1 illustrates an example of a system 100 that includes a block chain system 102 and one or more off-chain host systems 104. The block chain system 102 may have one or more computing resources 102, such as one or more server computers 102A, 102B, . . . , 102N as shown in FIG. 1), that are part of the block chain system and host the well-known distributed blockchain ledger system (an example of which is shown in FIG. 2). Each computing resource may include the well-known elements that are typically part of a computing resource such as, for example, one or more processors, memory, such as DRAM or SRAM, one or more persistent storage devices, such as flash memory or a hard disk drive, one or more databases, connectivity circuits, etc. that allow the computing resources to communicate with each other over a communications path and to host the blockchain ledger and/or process or generate a block to be appended to the blockchain ledger. The blockchain system 102 may further comprise one or more smart contracts 106 hosted on, stored on and/or executed by one or more computing resources 102 that is based on the blockchain ledger of the blockchain system. Each smart contract 106 may be a computerized transaction protocol that executes the terms of a process/protocol or contract in which the smart contract is visible to all users of the blockchain and uses the distributed blockchain ledger.

In the system 100 in FIG. 1, the blockchain system 102 may interact with each off-chain host system 104. Each off-chain host system 104 is a system that is not part of the blockchain system 102 and does not host the distributed blockchain ledger. However, it is desirable to be able to permit the blockchain smart contract to interact with one or more of the off-chain host systems in order to: 1) retrieve data from an off-chain host system (such as third party data inputs); and/or 2) cause real-world side-effects that are carried out by the off-chain host system 104. The off-chain system 104 may be implemented using one or more processors, memory, such as DRAM or SRAM, one or more persistent storage devices, such as flash memory or a hard disk drive, one or more databases, connectivity circuits, etc. that allow the off-chain system 104 to store data and host applications and communicate with the blockchain system 102 over a communications path and interact with the smart contract 106. As shown in FIG. 1, the off-chain system 104 may have one or more data stores 108 (implemented in various manners) that may store various data that may be accessed by the smart contract 106 using the system 100. Alternatively or in addition to the one or more data stores 108, the off-chain host system 104 may further have one or more applications/processes 110 resident on the off-chain host system that may perform various processes or acts or operations some of which may be triggered based on a request from the smart contract 106 of the blockchain system 102.

In the system 100, each of the blockchain system 102 and off-chain host system 104 may, in one embodiment, have at least one processor that may be used to execute a plurality of instructions or computer code that implement the methods described below with reference to FIGS. 3-4. In another embodiment, each of the blockchain system 102 and off-chain host system 104 may have one or more pieces of hardware (an integrated circuit, microcontroller, field programmable logic circuit and the like) that implement the methods described below with reference to FIGS. 3-4. Thus, the elements of these systems may be implemented in hardware and/or software. One element of the blockchain system 102 and the off-chain host system 104 may be a transaction manager element that manages the interactions between the smart contract 106 and the off-chain host system 104 including executing the processes shown in FIGS. 3-4. In addition, the transaction manager element may also coordinate the communications and data transfer protocols between the blockchain system 102 and the off-chain host system 104.

FIG. 2 illustrates an example of the blockchain ledger 200 that is part of the block chain system 102. The blockchain ledger may have one or more blocks (such as block 0, block 1, Block 3, . . . , block N as shown in FIG. 2. The blockchain thus consists of the blocks that hold timestamped batches of valid transactions. As shown in FIG. 2, each block has a header and each header may include a hash of the prior block in the blockchain, linking the two and a known Merkle root. Each block in the blockchain may also have a body of the block that contains the transactions associated with that particular block. The linked blocks form a chain, with only one (successor) block allowed to link to one other (predecessor) block.

Figure 3:
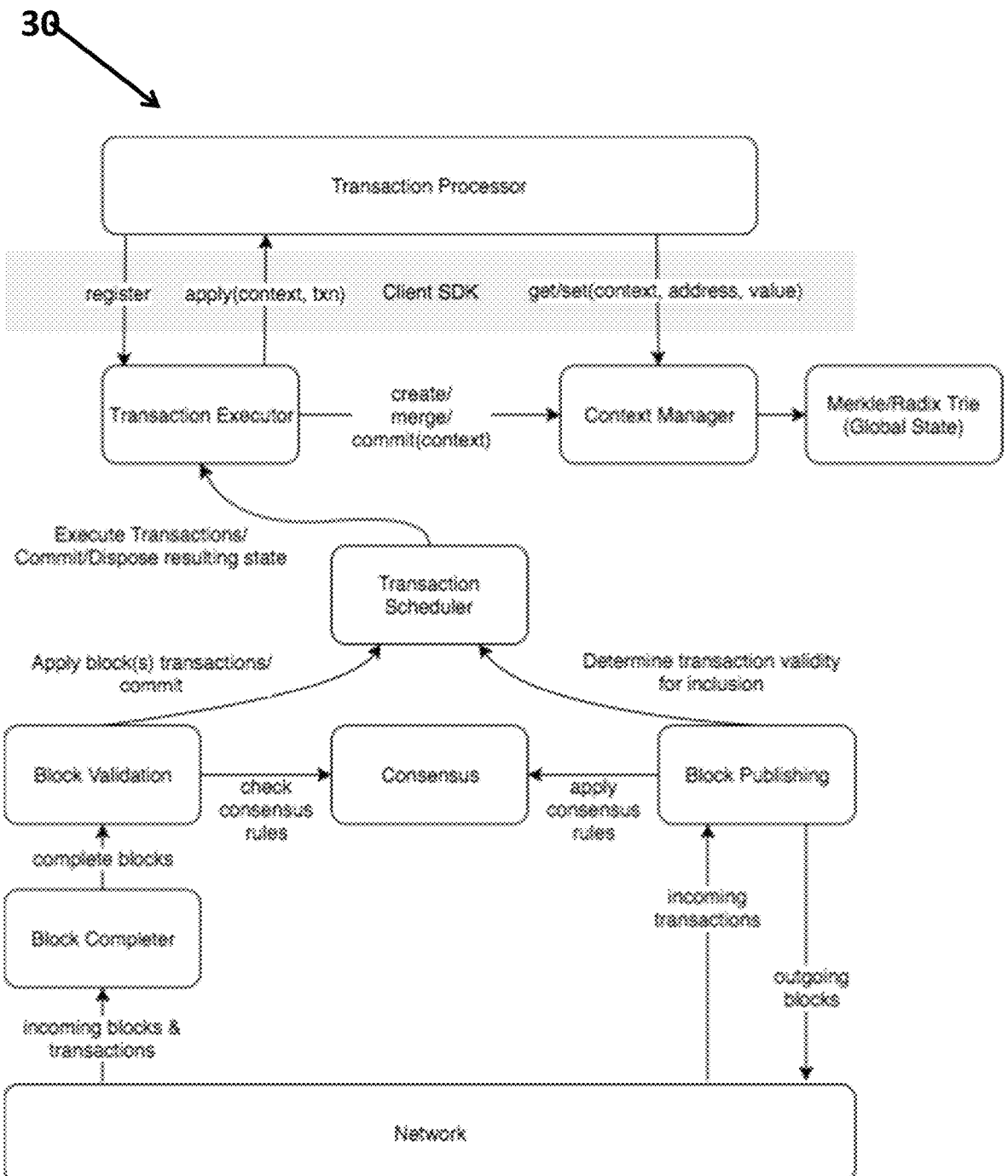
FIG. 3 illustrates an example of the Hyperledger Sawtooth blockchain platform architecture.

FIG. 3 illustrates an example of the Hyperledger Sawtooth blockchain platform architecture on top of which the secure cryptoasset component may be implemented. Further details of the Intel® Hyperledger Sawtooth blockchain platform may be found at https://www.hyperledger.org/projects/sawtooth and https://intelledger.github.io/introduction.html, both of which are incorporated herein by reference. It should be understood, however, that the secure cryptoasset component may also be implemented on other blockchain platforms in which it is desirable to provide secure currencies and cryptocurrencies.

Figure 4:
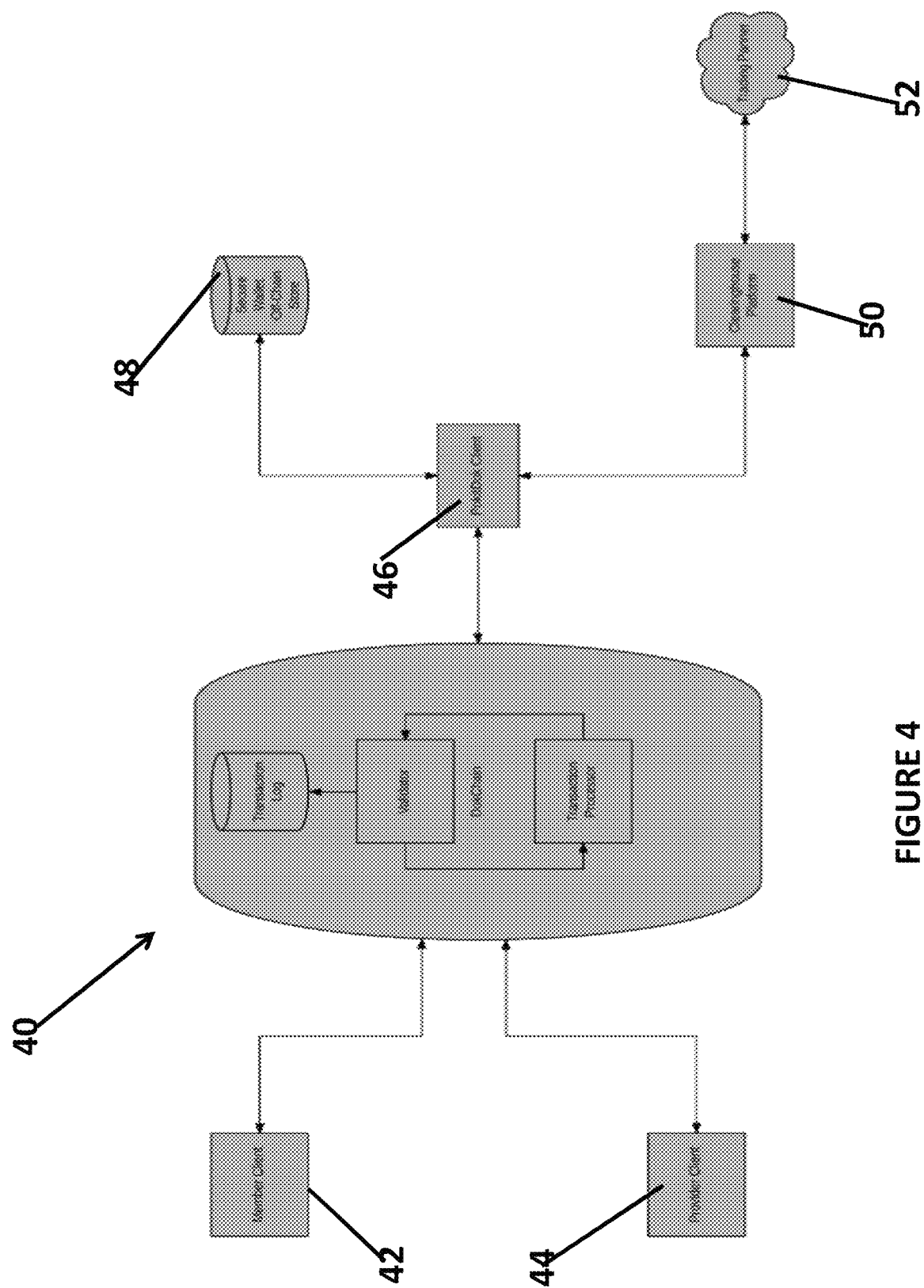
FIG. 4 illustrates an example of a healthcare system implemented on the Hyperledger Sawtooth platform.

FIG. 4 illustrates an example of a healthcare system 40 implemented on the Hyperledger Sawtooth platform in which components of the blockchain platform (the transaction processor, validator and transaction log) are shown. The healthcare system 40 may process healthcare transactions, such as eligibility transactions and the like, using the network. The system may thus further include one or more member client systems 42 (implemented on a computing device) and one or more provider client systems 44 (also implemented on a computing device) that can connect to and interact with the healthcare system. The client systems may be used by patients that utilize the system while the provider clients may be used by healthcare providers that utilize the system. The system may further comprise a client 46 that interfaces between the blockchain system/platform and an off chain store 48 and trading partners 52 through a clearinghouse 50. As an example, a patient may use the system in FIG. 4 to perform an eligibility check transaction that is described in more detail with reference to FIG. 6A-6G. It should be understood, however, the blockchain system and platform may be used to perform any number of different transactions in any number of different industries that are within the scope of this disclosure. In all of the above descriptions, the blockchain system/platform and its ledger may be implemented using one or more computer resources, databases and software.

The blockchain platform in FIG. 3 or the healthcare system with the blockchain platform in FIG. 4 may both include a secure cryptoasset component that may be implemented on top of the blockchain system. The secure cryptoasset component may be implemented in hardware or software. When the secure cryptoasset component is implemented in hardware, it may be a hardware device, such as a microcontroller, FPGA, etc. that has been specially configured to implement the secure cryptoasset processes. When the secure cryptoasset component is implemented in software, the secure cryptoasset component may be a plurality of lines of computer code/instructions that may be executed by a processor of a computer system, such as a processor of the blockchain platform computer system, to implement the secure cryptoasset processes. The processor executing the secure cryptoasset component may configured to the processor (and computer system) to implement the secure cryptoasset processes so that the computer system executing the secure cryptoasset component is specialized and programmed to perform the secure cryptoasset processes like a set of rules running on a computer system transforms that computer into specialized piece of hardware. The secure cryptoasset component described below provides a technical solution to the technical problem of the security of cryptocurrencies in blockchain platforms. Furthermore, the secure cryptoasset component only exists on computers and the Internet and necessarily requires the Internet and computers to function. In addition, the operations and processes of the secure cryptoasset component cannot be performed by a human mind since, for example, a human mind with pen and paper cannot maintain the distributed ledgers of the blockchain platform nor perform the secure cryptoasset component processes. The secure cryptoasset component thus provide an improvement to a technical blockchain platform that provides added security that did not exist in existing blockchain systems.

Returning to FIGS. 3-4, the blockchain platform shown in those figures does not come with a cryptocurrency. However, as it is the purpose of system in FIG. 4 to facilitate a multitude of transactions across industries, monetary transfer will play an essential role in the network's operations. A secure cryptoasset component may be built on top of the blockchain platform to provide added security (not currently present in blockchain systems). For example, since the system in FIG. 1 or 4 implements smart contracts handling private health information (PHI), security is imperative for all components of the network. However, currency on a blockchain network is an obvious target for a malicious actor that is thwarted by the secure cryptoasset component.

The secure cryptoasset component may provide more security to a cryptocurrency that is implemented using an account design. In the account design, every user has an account that records the amount of coin (cryptocurrency) owned by the user. The account functionalities allow spending coins from one account to another account.

In the secure cryptoasset component and the hyperledger sawtooth blockchain platform, a Sawtooth transaction may be a transaction that is a smart contract executed on the blockchain platform (further details of which may be found at https://intelledger.github.io/architecture/transactions_and_batches.html that is incorporated herein by reference.) A Global State Store is a Store that may be the Merkle tree storing DokChain's blocks (further details of which may be found at https://intelledger.github.io/architecture/global_state.html that is incorporated herein by reference.) DokChain is a name for the blockchain system and distributed ledger of the system shown in FIG. 4. Jane is a user of the system and Jane executes a transaction using Jane's pubkey. The blockchain platform (or the healthcare system example in FIG. 4) has its own cryptocurrency, called a DokChain's coin ($CURE) that is implemented as described above.

The first challenge in providing additional guards for $CURE comes from the fact that every transaction has the ability to modify the Store. Since using the account design implies that Jane's $CURE balance is simply stored somewhere in the Store, every transaction has the ability to modify Jane's $CURE balance. As a result, the secure cryptoasset component guarantees the program correctness of the transactions related to managing the coin, but also to make sure all the other transactions do not touch coin addresses in the Store to guarantee the security of the currency.

Figure 5:
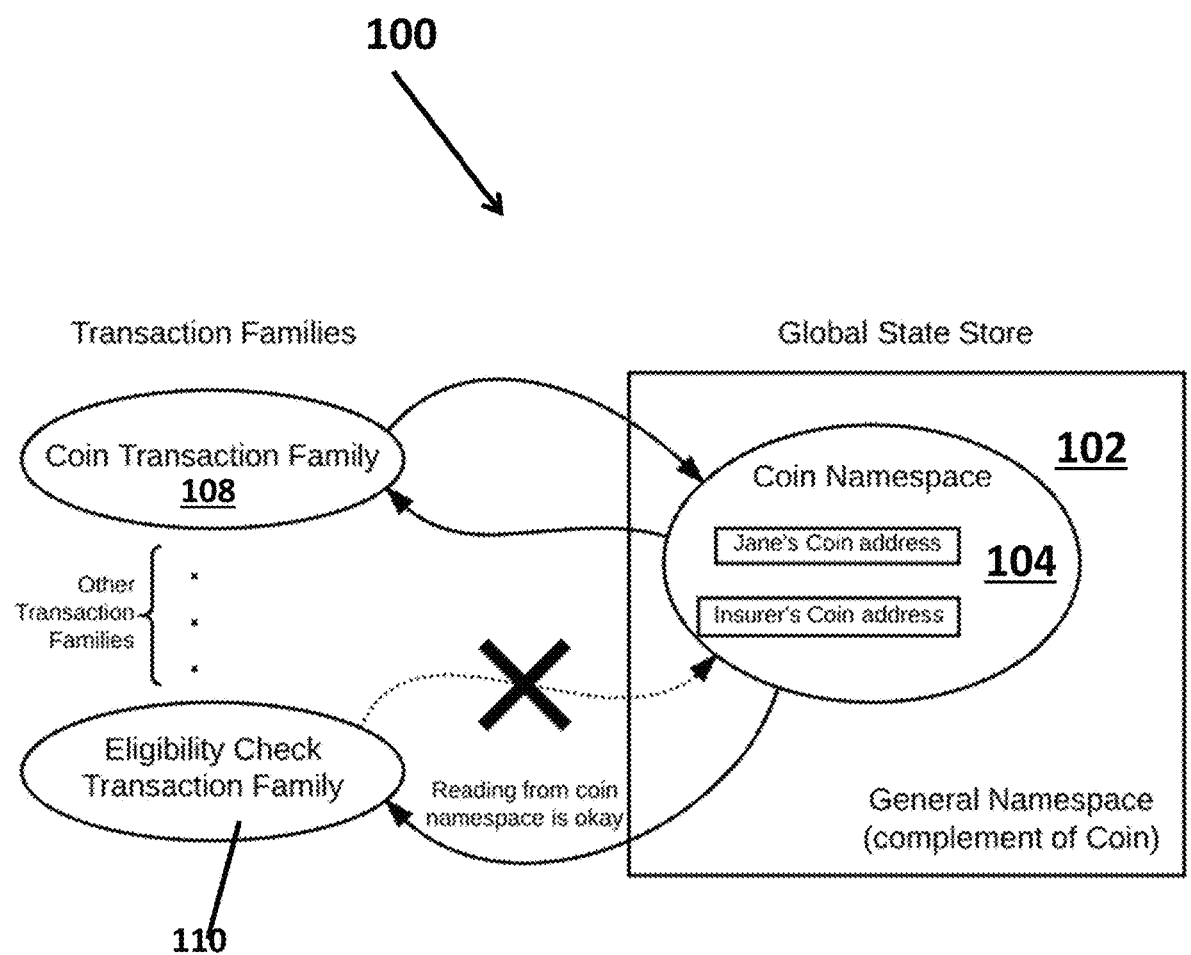
FIG. 5 illustrates a namespace mechanism that is part of a blockchain platform, such as the Hyperledger Sawtooth platform.

FIG. 5 illustrates a namespace mechanism 100 that is part of a blockchain platform, such as the Hyperledger Sawtooth platform. For the Hyperledger Sawtooth platform, the namespace mechanism is described in more detail at https://intelledger.github.io/app_developers_guide/address_and_namespace.html that is incorporated herein by reference. The namespace mechanism may be used by the secure cryptoasset component to guarantee that all other transactions (not including coin transactions) do not touch coin addresses in the Store. The namespace mechanism 100 uses the global state store 102 and allows the store 102 to be separated into different namespaces. Thus, the secure cryptoasset component may separate the namespace into a general namespace and a coin namespace 104. The coin namespace 104 may hold/store the coin address (and coin balance) for each user of the system, such as Jane or an Insurer. Furthermore, read/write permissions for the various different namespaces can be granted on a transaction family basis. For example, as shown in FIG. 5, the system and method implements the coin namespace 104 and a coin transaction family 108 and other transaction families including an eligibility check transaction family 110. In this example, all $CURE balances are stored in the coin namespace 104 portion of the Store and only the coin transaction family 108 has write permissions to this namespace as shown in FIG. 5. This solution greatly simplifies the securing the coin since, instead of having to inspect every transaction for manipulation of the coins, only the transaction in the coin transaction family 108 must be analyzed. As a corollary, any coin transfer on blockchain platform or the system in FIG. 4 must use the transactions implemented by the coin transaction family.

The above solution and architecture does limit certain types of transaction. For example, if Jane would like an eligibility check with her insurance company through DokChain (the blockchain ledger and system of the system in FIG. 4), and the cost for the check is 10 $CURE, a system might try to code the coin transfer logic into the eligibility check transaction. However, that is not possible with the secure cryptoasset component since the eligibility check transaction 110 is associated with a Sawtooth transaction family that does not have write permission (note large X where the write access by the eligibility transaction is shown in FIG. 5) to the coin namespace 104. Instead, Jane must execute an eligibility check transaction and a coin transfer transaction separately.

This creates a potential trust problem since which transaction comes first? Must Jane trust her insurance company and first send the coin, or does the insurance company have to trust Jane? Fortunately, through Sawtooth's batching mechanism neither is required. Further details of batching in the Hyperledger Sawtooth blockchain platform may be found at https://intelledger.github.io/architecture/transactions_and_batches.html that is incorporated herein by reference, Since a batch is the atomic unit in Sawtooth, batching the eligibility check transaction and the coin transfer transaction ensures that either: 1) both transactions execute successfully; or 2) neither transaction does solving the trust problem.

FIG. 5 illustrates the general solution. Any transaction that requires the transfer of coin can be decoupled with the coin transfer transaction executed separately along the same lines as the example above. If a strong coupling is desired, these transactions can be batched together as described above.

The secure cryptoasset component also provides a mechanism to guarantee the validity of the transactions in the coin transaction family. The secure cryptoasset component may use a token standard that implement the "transfer", "approve", and "transfer_from" transactions. The component may additionally implement a "free_approvals transaction" to allow for unused approvals to be released. In one implementation, the secure cryptoasset component may use the known ERC20 Token Standard, further details of which may be found at https://theethereum.wiki/w/index.php/ERC20_Token Standard that is incorporated herein by reference.

The "transfer" transaction has parameters "to_pubkey" and "amount", and the effect of the transfer transaction is for amount to be transferred from the originator (the equivalent of Ethereum's msg.sender) to "to_pubkey" (the public key of the receiver of the coin amount. The transactions "approve" and "transfer_from" operate to first approve the transfer of coin using the approve transaction, and then later the approved pubkey calls transfer_from to actually transfer the coin.

FIG. 6A-6G is an example of an eligibility transaction using secure cryptoassets in the blockchain platform and facilitated by the secure cryptoassets component of the system. In this example:

COIN_DATA={'spendable_amount':int, 'approvals': dict( )} where approvals is a dictionary mapping each approved pubkey to the approved amount and a release_time. For the example in FIGS. 6A-6G, spendable_amount is shown as spendable, amount as amt, release_time as rt, and use a terse representation of a datetime is used for clarity and simplicity. In the example, it is assumed that the current time is 09:00. In FIGS. 6A-6G, different stages of the eligibility transaction and the coin transaction are highlighted to show the processes steps implemented by the secure cryptoassets component of the system.

In the example in FIGS. 6A-6G, Jane's goal is to perform an eligibility check using the DokChain. She first creates an approval allowing Insurer to collect 10 $CURE as highlighted in FIG. 6A. However, Jane (accidentally) submits a release time equal to the current time, 09:00 as highlighted in FIG. 6B. The Insurer, wary of the possibility that Jane might try to free her approval after receiving the eligibility check but before the Insurer is about to execute transfer_from, informs Jane that she must correct the release time (rt) as highlighted in FIG. 6C.

Figure 6A:
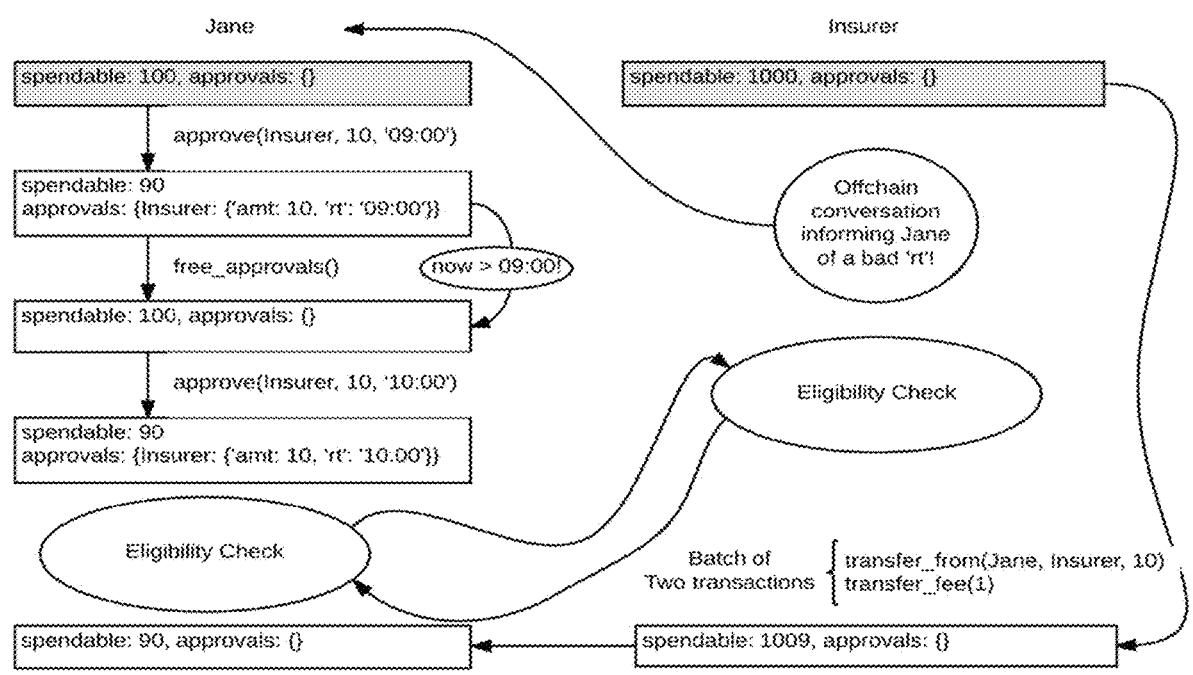
FIG. 6A-6G is an example of an eligibility transaction using secure cryptoassets in the blockchain platform.
Figure 6B:
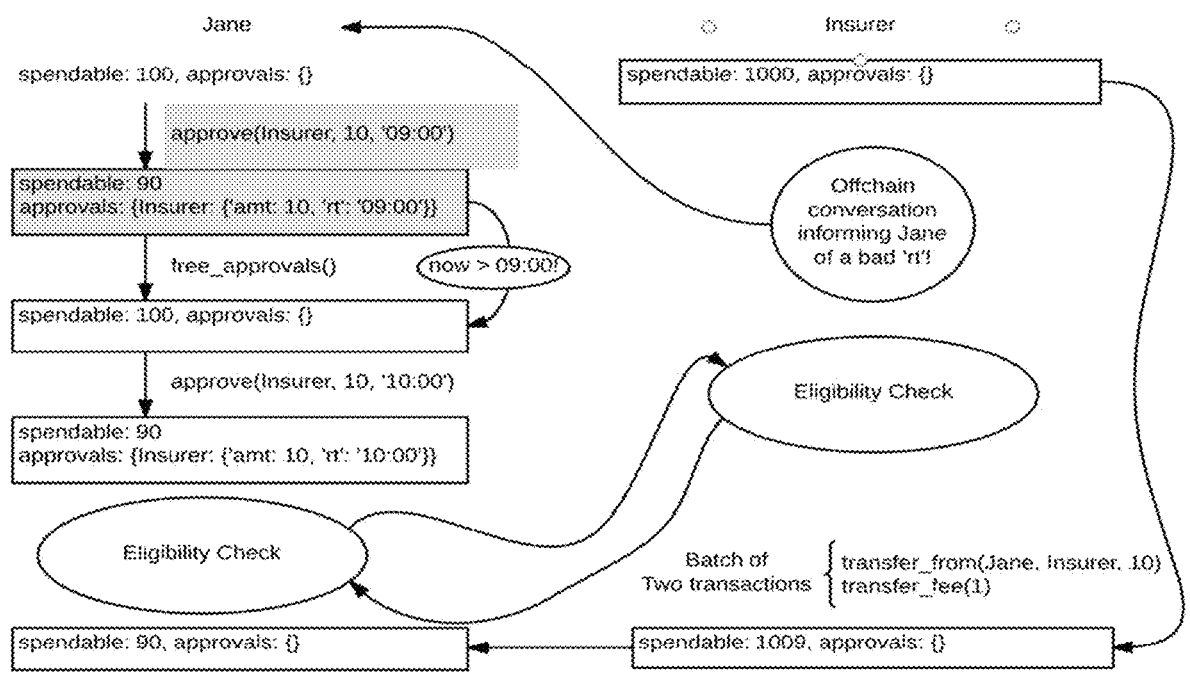
Figure 6C:
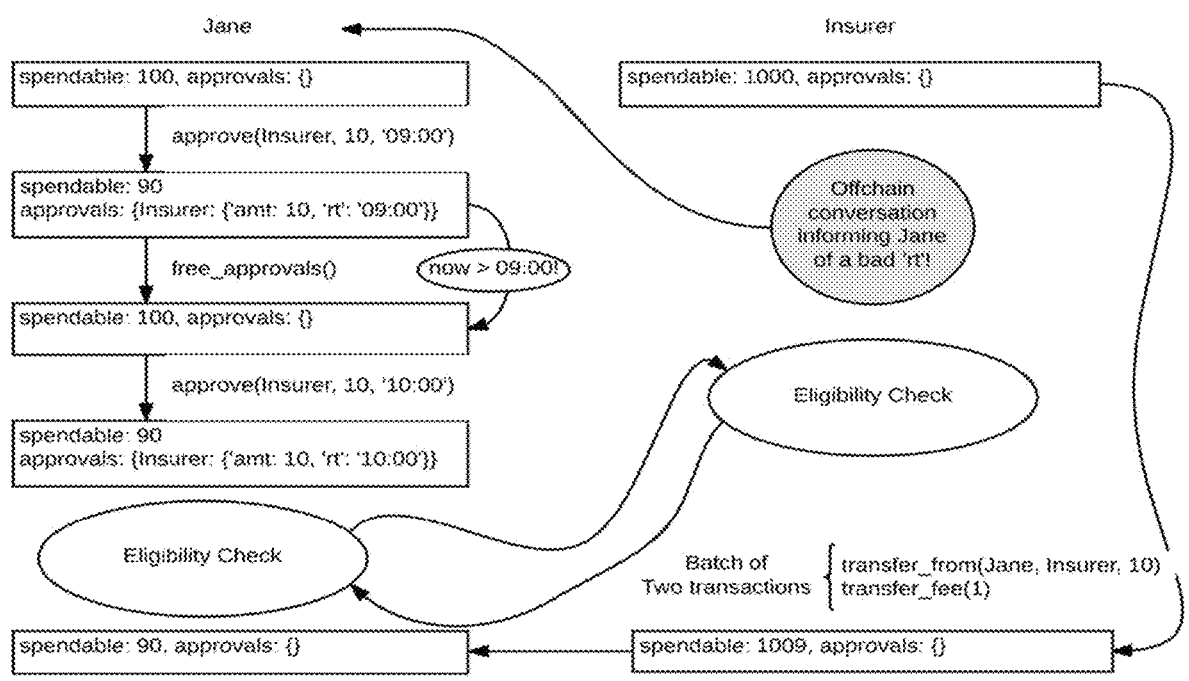
Figure 6D:
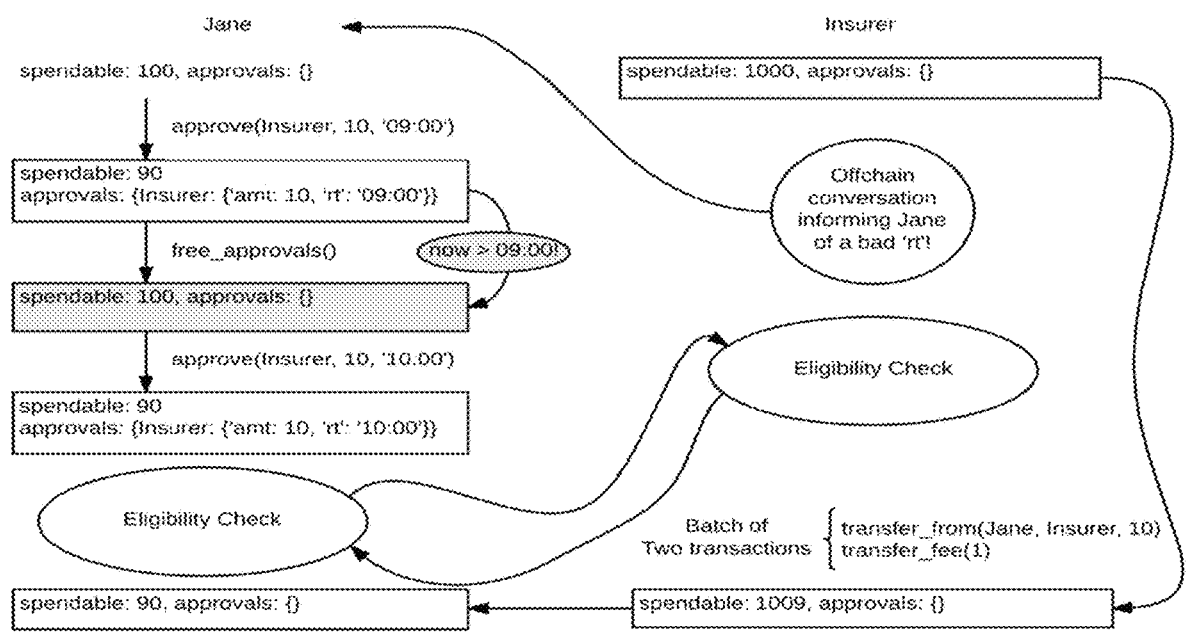
Figure 6E:
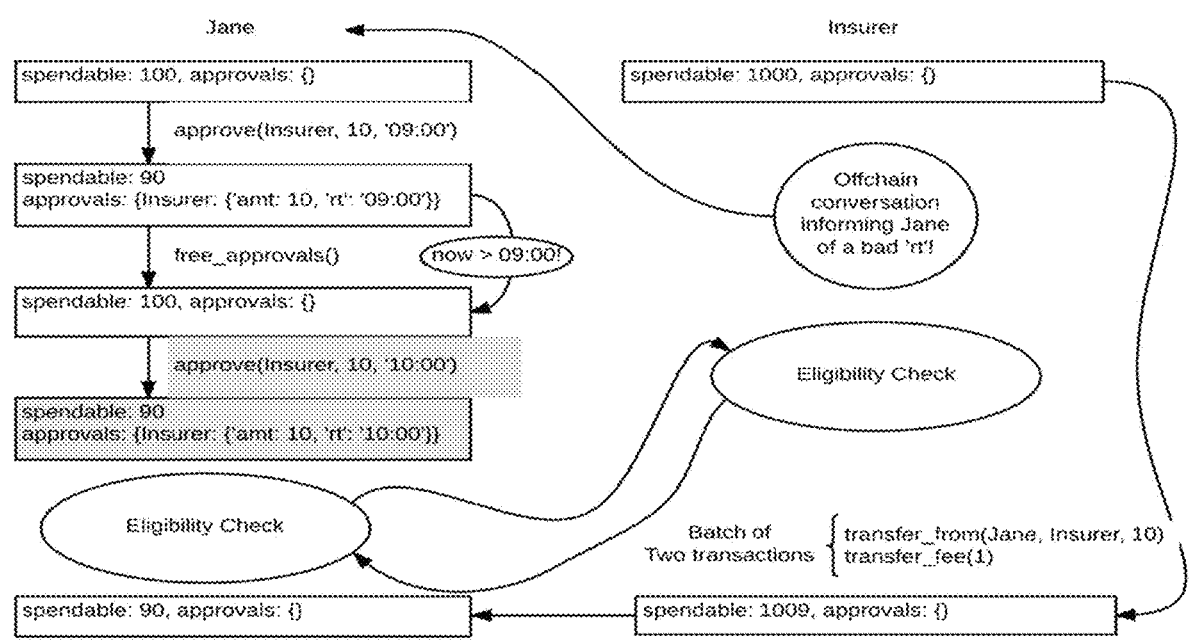
Figure 6F:
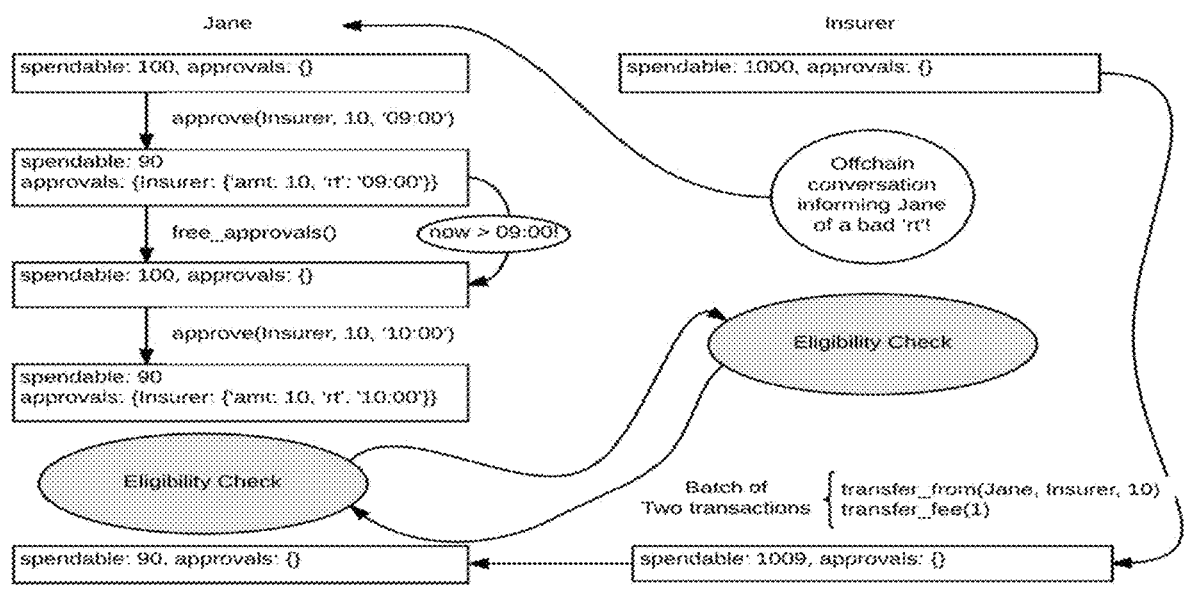
Figure 6G:
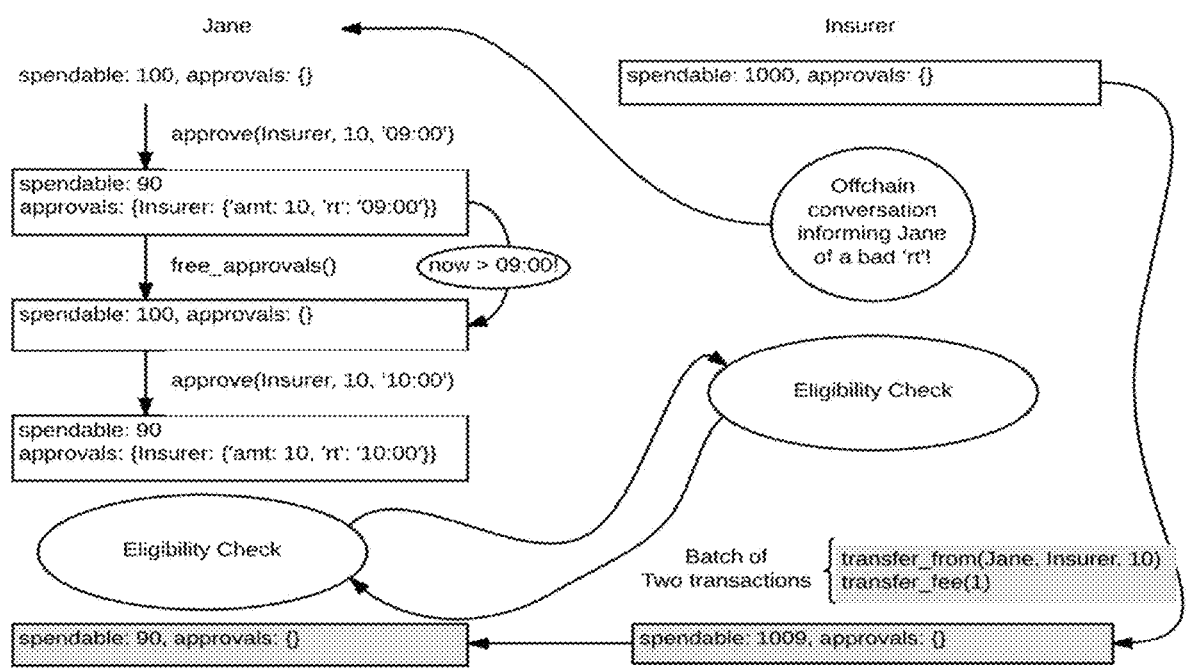

Jane the frees the original approval as highlighted in FIG. 6D and creates another approval with a later release time (10:00 in the example) as highlighted in FIG. 6E. The eligibility check transaction executes as highlighted in FIG. 6F, and then Insurer calls transfer_from batched with a transfer_fee transaction as highlighted in FIG. 6G.

In the blockchain system of the system in FIG. 4, the DokChain will operate as a private blockchain network with a relatively small number of Nodes. The Nodes will be hosted by DokChain Affiance members, and each of these Nodes will run validators (part of the Hyperledger Sawtooth blockchain platform described above) responsible for validating transactions submitted on DokChain. Each of these validators has a pubkey, and hence are eligible to receive $CURE. Similar to other blockchain systems, such as Bitcoin and Ethereum, these validators will receive "minted" coin for each block they validate.

The minting reward may fall short of the actual market-determined value of validating a DokChain block. Hence, much like other blockchain systems, such as BitCoin's fee and Ethereum's gas, the system has a mechanism to augment this potential minting reward shortfall which is the transfer_fee transaction. This transfer_fee transaction is a special transaction that pays the block's proof of elapsed time (PoET in the Hyperledger Sawtooth blockchain system and described in more detail at intelledger.github.io/introduction.html that is incorporated herein by reference) winning validator for validating the transaction. It should be understood that different consensus algorithms may also be used like PBFT without departing from the scope of the disclosure. Thus, the transfer fee provides additional reward to validators for processing transactions and maintaining the DokChain network.'

In the example in FIGS. 6A-6G, batching may be used for this transfer_fee transaction. The batching example given earlier promoted batching using a trustless argument, which is not very well motivated for DokChain. However, batching the transfer_fee transaction is important. If the original transaction (transfer_from in the above example) fails, then we do not want the fee to be transferred. This is ensured if they are batched together.

In the example above for the COIN_DATA data structure, Jane does not own and hence cannot modify these approvals. The only access Jane has to these approvals is through the approve transaction or the free_approvals transaction. The former only allows adding approvals, and the later only frees approvals after the specified release time.

In most typical blockchain systems, the system timestamps each block to ensure that all of the blocks have the same concept of time. However, the disclosed system and method with the secure cryptoasset component does not actually need a timestamp since the release time is explicitly represented in Jane's approvals and the free_approvals code is known, Insurer can make its own decision on whether the release time is too early or not. If Jane does not agree with Insurer's conservative estimate of the "now" computation on DokChain, then they can take that argument off-chain!

The transfer_fee transaction may be implemented in a novel manner. The challenge is that at the time of the transfer_fee transaction creation, the PoET winner of the block is not known. To solve this problem, the DokChain's current implementation uses an off-chain oracle. Specifically, the transfer_fee transaction transfers the fee from the originator to a fixed address on DokChain. There is only one pubkey, set by DokChain's governance through Sawtooth's settings transaction family, that can read/write to this fixed address. Then, the oracle is activated periodically to retrospectively distribute the fees stored at this address to the PoET winning validators. In other embodiments of the system, the blockchain platform, such as Hyperledger Sawtooth may include a BatchInjector transaction which allows for a much cleaner design in regards to this transfer_fee transaction.

In the example throughout this disclosure, the system uses Hyperledger Sawtooth to implement the secure cryptoasset component framework, such as for the healthcare system shown in FIG. 4. In summary, using the namespace concept, the disclosed component restricts coin account write access to a single transaction family. Furthermore, motivated by the ERC20 Token Standard, we implemented only a select few (assiduously designed) smart contracts within this coin transaction family.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. An apparatus, comprising:
a blockchain system of a blockchain platform; and
a secure cryptoasset component associated with the blockchain system, wherein the secure cryptoasset component comprises a global state store;
wherein the secure cryptoasset component is configured to:
store a namespace in the global state store, wherein the namespace comprises a coin namespace;
store a set of access permissions in the coin namespace, an eligibility check transaction family, and a coin transaction family, wherein the set of the access permissions stored in the coin namespace comprises a read permission for the eligibility check transaction family to access the coin namespace, and read and write permissions for the coin transaction family to access the coin namespace;
store, in the coin namespace, a first user coin address and a first user coin balance of a first user of a plurality of users, and a second user coin address and a second user coin balance of the second user of the plurality of users;
receive an eligibility check transaction from the first user, wherein the eligibility check transaction comprises information associated with the coin transaction family, the first user coin address and a spendable amount of a secure cryptoasset;
receive a coin transfer transaction from the second user, wherein the coin transfer transaction comprises the information associated with the coin transaction family, the first user coin address, the second user coin address, and the spendable amount of the secure cryptoasset;
grant the coin transaction family the read and write permissions to access the coin namespace based on the received information associated with the coin transaction family;
batch the received eligibility check transaction and the received coin transfer transaction;
process the batch using the coin transaction family, wherein the processing further comprises:
transferring the spendable amount of the secure cryptoasset from the first user coin address to the second user coin address by executing the coin transfer transaction; and
executing the eligibility check transaction.

2. The apparatus of claim 1, wherein the eligibility check transaction family and the coin transaction family are smart contracts.

3. The apparatus of claim 1, wherein the first user and second user are a patient and an insurer.

4. A method, comprising:
storing, by a secure cryptoasset component of a blockchain system, a namespace in a global state store, wherein the secure cryptoasset component comprises the global state store and the namespace comprises a coin namespace;
storing, by the secure cryptoasset component, a set of access permissions in the coin namespace, an eligibility check transaction family, and a coin transaction family, wherein the set of the access permissions stored in the coin namespace comprises a read permission for the eligibility check transaction family to access the coin namespace, and read and write permissions for the coin transaction family to access the coin namespace;
storing, by the secure cryptoasset component, in the coin namespace, a first user coin address and a first user coin balance of a first user of a plurality of users, and a second user coin address and a second user coin balance of the second user of the plurality of users;
receiving, by the secure cryptoasset component, an eligibility check transaction from the first user, wherein the eligibility check transaction comprises information associated with the coin transaction family, the first user coin address, and a spendable amount of a secure cryptoasset;
receiving, by the secure cryptoasset component, a coin transfer transaction from the second user, wherein the coin transfer transaction comprises the information associated with the coin transaction family, the first user coin address, the second user coin address and the spendable amount of the secure cryptoasset;
granting, by the secure cryptoasset component, the coin transaction family the read and write permissions to access the coin namespace based on the received information associated with the coin transaction family;
batching, by the secure cryptoasset component, the received eligibility check transaction and the received coin transfer transaction;
processing, by the secure cryptoasset component, the batch using the coin transaction family, wherein the processing further comprises:
transferring the spendable amount of the secure cryptoasset from the first user coin address to the second user coin address by executing the coin transfer transaction; and
executing the eligibility check transaction.

5. The method of claim 4, wherein the eligibility check transaction family and the coin transaction family are smart contracts.

6. The method of claim 4, wherein the first user and the second user are a patient and an insurer.

7. The apparatus of claim 1, wherein the secure cryptoasset component, when storing the namespace in the global state store, is further configured to:
configure a general namespace and a coin namespace in the namespace.

8. The method of claim 4, wherein the storing the namespace of the global state store further comprises:
configuring, by the secure cryptoasset component, a general namespace and a coin namespace in the namespace.

* * * * *